(12) United States Patent
Lim et al.

(10) Patent No.: US 7,062,083 B2
(45) Date of Patent: Jun. 13, 2006

(54) IMAGE RETRIEVAL METHOD BASED ON COMBINATION OF COLOR AND TEXTURE FEATURES

(75) Inventors: Choi Yang Lim, Gyeonggi-do (KR); Cho Nam Ik, Seoul (KR); Kwak Jung Won, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 641 days.

(21) Appl. No.: 10/040,621

(22) Filed: Jan. 9, 2002

(65) Prior Publication Data

US 2002/0122587 A1   Sep. 5, 2002

(30) Foreign Application Priority Data

Jan. 9, 2001   (KR) ............................... 2001-1130

(51) Int. Cl.
G06K 9/00   (2006.01)
G06K 9/34   (2006.01)

(52) U.S. Cl. ..................... 382/164; 382/165; 382/220; 382/305; 707/6

(58) Field of Classification Search ............... 382/164, 382/165, 190, 195, 257–260, 279, 305, 220; 348/582; 707/6
See application file for complete search history.

(56) References Cited

U.S. PATENT DOCUMENTS 5,083,571 A * 1/1992 Prichep ...................... 600/544
5,999,647 A * 12/1999 Nakao et al. ............... 382/187

(Continued)

FOREIGN PATENT DOCUMENTS

JP   11-96364 A   4/1999

(Continued)

OTHER PUBLICATIONS

Deng et al. "Peer Group Filtering and Perceptual Color Image Quantization," Proc. 1999 IEEE International Symposium on Circuits and Systems, vol. 4, May 30-Jun. 2, 1999, pp. 21-24.*

(Continued)

*Primary Examiner*—Bhavesh M. Mehta
*Assistant Examiner*—Yubin Hung
(74) *Attorney, Agent, or Firm*—Sughrue Mion, PLLC (57) ABSTRACT

An image retrieval method with improved performance in which a data image similar to a query image is retrieved by appropriately combining color and texture features. The method for retrieving a data image similar to a query image in an image database containing a plurality of data images involves: calculating color and texture distances between a query image and each data image in the image database; weighting the calculated color and texture distances with predetermined weighting factors; calculating a feature distance between the query image and each data image by combining the weighted color and texture distances by considering human visual perception attributes; and determining the data image similar to the query image using the feature distance. According to the image retrieval method, data images similar to a query image can be retrieved based on the human visual perception mechanism by combining both color and texture features extracted from image regions. In particular, the image region based retrieval enables accurate retrieval of more objects and many kinds of information from a single image.

34 Claims, 7 Drawing Sheets

U.S. PATENT DOCUMENTS

| | | | |
|---|---|---|---|
| 6,131,082 A * | 10/2000 | Hargrave et al. | 704/7 |
| 6,345,274 B1 * | 2/2002 | Zhu et al. | 707/5 |
| 6,463,432 B1 * | 10/2002 | Murakawa | 707/5 |
| 6,519,360 B1 * | 2/2003 | Tanaka | 382/162 |
| 6,563,959 B1 * | 5/2003 | Troyanker | 382/282 |
| 6,693,962 B1 * | 2/2004 | Murching et al. | 375/240.11 |
| 6,801,657 B1 * | 10/2004 | Cieplinski | 382/164 |
| 6,865,302 B1 * | 3/2005 | Chang | 382/305 |
| 2002/0006221 A1 * | 1/2002 | Shin et al. | 382/181 |

FOREIGN PATENT DOCUMENTS

| | | |
|---|---|---|
| JP | 2000-48181 A | 2/2000 |
| JP | 2000-216979 A | 8/2000 |
| JP | 2000-348179 A | 12/2000 |
| WO | WO 00/45337 A1 | 8/2000 |
| WO | WO 00/46748 | 8/2000 |
| WO | WO 00/46748 A1 | 8/2000 |
| WO | WO 00/65839 | 11/2000 |
| WO | WO 00/65839 A1 | 11/2000 |
| WO | WO 00/70881 | 11/2000 |
| WO | WO 00/70881 A1 | 11/2000 |

OTHER PUBLICATIONS

Deng et al. "Color Image Segmentation," 1999 IEEE Conf. On Computer Vision and Pattern Recognition, vol. 2, Jun. 23-25, 1999, pp. 446-451.*

Ma et al. "Texture Features and Learning Similarity," Proc. 1996 IEEE Conf. on Computer Vision and Pattern Recognition, Jun. 18-20, 1996, pp. 425-430.*

A. Rosenfeld and A.C. Kak, Digital Picture Processing, vol. 2, 2nd ed., 1982, p. 209.*

* cited by examiner

IMAGE RETRIEVAL METHOD BASED ON COMBINATION OF COLOR AND TEXTURE FEATURES

BACKGROUND OF THE INVENTION

1. Field of the Invention

The present invention relates to an image retrieval method, and more particularly, to an image retrieval method based on color and texture describers that are significant in human visual perception. The present application is based on Korean Application No. 2001-1130, filed on Jan. 9, 2001, which is incorporated herein by reference.

2. Description of the Related Art

In recent years, a sudden increase in multimedia data has facilitated research in the fields of data retrieval and databases for efficient multimedia data management. In particular, research in the field of image retrieval has focused on an alternative to existing text-based image retrieval methods or further advanced image retrieval methods. For text-based data retrieval, a great effort needs to be made to retrieve the desired data from a large-scale database, and it is unsuitable for partial-feature-based retrieval or quantitative data retrieval. To address these drawbacks, approaches have been suggested for a retrieval method using numeric feature descriptors which well represent the features of the multimedia data.

Color and texture features, which are dominant characteristics in human visual perception, can be expressed by feature descriptors. According to a conventional image retrieval method, an image database in which data images are indexed by a feature descriptor is built up, and desired images are retrieved from the image database based on the feature descriptor. An example of a conventional color feature based image retrieval method includes extracting color vectors, quantizing the color vectors, getting a representative color vector from the quantized color vectors, and retrieving the image data using the representative color vector. A conventional texture feature based image retrieval method uses the co-occurrence matrix, the Gaussian Markov Random Field (GMRF) models, etc. A recent method of texture feature extraction uses a Gabor filter that enables a multi-channel approach suitable for the human perception mechanism of visual images.

In the conventional image retrieval methods, color and texture based data retrievals are separately carried out, and color and texture features are extracted from the entire image. For this reason, the conventional methods cannot be applied to an image having a plurality of objects therein or expressed in multiple colors and textures. Either the color or the texture features are available for retrieving particular image data. Thus, there is a problem of incorrect image retrieval results.

To solve these problems, another conventional image retrieval method retrieves a target image in the vector space formed for both color and texture vector components. Here, the vector space is formed through simple summations of the color and texture vector components, thereby increasing dimensionality of the vector space. Thus, there is a need to redefine a distance function to the vector space with the increased dimensionality and to calculate a weighting factor for each component, which is relatively burdensome. The computations are highly complex and the results may be incorrect.

SUMMARY OF THE INVENTION

To solve the above-described problems, it is an object of the present invention to provide an image retrieval method based on the combination of color and texture features, and with improved performance.

To achieve the object of the present invention, there is provided a method for retrieving a data image similar to a query image, using a feature distance calculated by combining color and texture distances by considering human visual perception attributes.

In one embodiment, the present invention provides a method for retrieving a data image similar to a query image, in an image database containing a plurality of data images, the method comprising: (a) calculating color and texture distances between a query image and each data image in the image database; (b) weighting the calculated color and texture distances with predetermined weighting factors; (c) calculating a feature distance between the query image and each data image by combining the weighted color and texture distances by considering human visual perception attributes; and (d) determining the data image similar to the query image using the feature distance. Preferably, before step (a), the image retrieval method further comprises: (pa-1) segmenting the query image and each data image into a plurality of regions using color features; and (pa-2) determining sample regions in the query image and each data image for extraction of texture features.

Preferably, step (a) comprises: (a1) generating color vectors of the plurality of regions using the color features and calculating color distances; and (a2) generating texture vectors of the plurality of regions using the texture features and calculating texture distances.

Preferably, step (pa-1) comprises quantizing color vectors of the query image and each data image. This step of quantizing the color vectors may comprise: (pa-1-1) performing peer group filtering on the query image and each data image for noise removal and smoothing effects; and (pa-1-2) clustering filtered pixel values of the query image and each data image using the generalized Lloyd algorithm.

Preferably, the image retrieval method further comprises: defining a J-value indicating color uniformity in each pixel of the query image and each data image which have undergone quantization; storing the J-value in each pixel of the query image and each data image to obtain J-images; segmenting each J-image into a plurality of regions by a predetermined segmentation method; repeating the segmentation of each J-image to obtain a map of over-segmented regions for each J-image; and obtaining a final map for each J-image by merging the over-segmented regions based on correlation of color;

Preferably, step (pa-1-2) comprises applying a predetermined algorithm to increase the number of resulting clusters or to merge the resulting clusters.

In the image retrieval method, the color features are expressed by a color feature descriptor $f_c(I_k)$ with a representative color vector and the percentage of the representative color vector for each region. The color feature descriptor $f_c(I_k)$ may be expressed by:

$$f_c(I_k) = \{(\bar{c}_{k1}, p_{k1}), (\bar{c}_{k2}, p_{k2}), \ldots, (\bar{c}_{kN_k}, p_{kN_k})\}$$

where k is a positive integer indicating the serial number of each region, $\bar{c}_{ki}$ is the i-th representative color vector of the k-th region (i=1,2, . . . , N), $p_{ki}$ is the percentage of the i-th representative color vector in the k-th region, and $N_k$ is the number of the representative color vectors in the k-th region.

Preferably, the image retrieval method further comprises indexing a feature vector space by a representative color and its percentage in each segmented region. This step of indexing the feature vector space may comprise: assigning representative colors to grid points in a color space having a grid structure; and storing the result of the assignment as a table in a database.

In the image retrieval method, the color distance between each color vector of each region of the query image and each color vector of each region of each data image may be calculated using:

$$d_c(I_1, I_2) = \sum_{i=1}^{N_1} p_{1i}^2 + \sum_{i=1}^{N_2} p_{2i}^2 - \sum_{i=1}^{N_1}\sum_{j=1}^{N_2} 2a_{1i,2j}p_{1i}p_{2j}$$

where, when $T_d$ is the maximum distance by which similarity of two colors is determined, $\alpha$ is a predetermined scaling coefficient, $d_{max}=\alpha T_d$, and $d_{ij}$ is the Euclidean distance $\|c_i-c_j\|$ between two color vectors $c_i$ and $c_j$, $$a_{ij} = 1 - \frac{d_{ij}}{d_{max}}$$

if $d_{ij} \leq T_d$, and $a_{ij}=0$ if $d_{ij}>T_d$.

In the image retrieval method, preferably, step (a2) uses the Gabor function. In step (a2), the texture vectors of the plurality of regions may be generated using the Gabor function having N frequency channels and M orientation channels, where N and M are predetermined positive integers.

In the image retrieval method, the texture features are expressed by a texture feature descriptor $f_t(I_k)$:

$$f_t(I_k)=\{(m_{k11}, \sigma_{k11}), (m_{k12}, \sigma_{k12}), \ldots, (m_{k1M}, \sigma_{k1M}), (m_{k21}, \sigma_{k21}), \ldots, (m_{kij}, \sigma_{kij}), \ldots, (m_{kNM}, \sigma_{kNM})\}$$

where $m_{kij}$ the mean value of the pixel values of the i-th frequency channel and j-th orientation channel for region $I_k$, and $\sigma_{kij}$ is the deviation of the pixel values of the i-th frequency channel and the j-th orientation channel for region $I_k$.

In step (a2), the texture distance between each color vector of each region of the query image and each color vector of each region of each data image may be calculated using:

$$d_t(I_1, I_2) = \sum_{i=1}^{N}\sum_{j=1}^{M} \left|\frac{m_{1ij}-m_{2ij}}{\sigma(m_{ij})}\right| + \sum_{i=1}^{N}\sum_{j=1}^{M} \left|\frac{\sigma_{1ij}-\sigma_{2ij}}{\sigma(\sigma_{ij})}\right|.$$

where $\sigma(m_{ij})$ and $\sigma(\sigma_{ij})$ are the standard deviations for all $m_{ij}$S, and $\sigma_{ij}$S, respectively.

Preferably, step (pa-2) comprises: (pb-1) obtaining a grid map of the query image and each data image; and (pb-2) obtaining a texture sample of a desired size for each region based on the grid map. In this case, step (pb-1) may comprise: (pb-1-1) taking a rectangle M(i, j) having largest side lengths for a sample region, where 0<i<n and 0<j<m; (pb-1-2) dividing the rectangle M(i, j) into sub-rectangles each having a 1×1 size; and (pb-1-3) obtaining a grid map for the sample region using a predetermined function $$M_{grid}(i,j) = \begin{cases} 1 & \text{if } p_{ij}(x,y) \subset I_k \text{ for } \forall (x,y) \\ 0 & \text{otherwise} \end{cases}$$

which outputs 1 if all the divided grids belong to the sample region, and otherwise, outputs 0, the predetermined function expressed by:

where $$0 \leq i \leq \left[\frac{n}{l}\right]-1, 0 \leq j \leq \left[\frac{m}{l}\right]-1,$$

$0 \leq x \leq l-1$, $0 \leq y \leq l-1$, and $p_{ij}(x,y)$ is a point that belongs to rectangle M(il+x, jl+y). Preferably, after step (pb-1-3), the image retrieval method further comprises: (pb-1-4) transforming the grid map obtained in step (pb-1-3) to a grid distance map by repeating computations with:

$$\{M_{grid}^d(i,j)\}_0 = M_{grid}(i,j)$$

and $$\{M_{grid}^d(i,j)\}_n = \min(\{M_{grid}^d(i,j-1)\}_{n-1}, \{M_{grid}^d(i-1,j)\}_{n-1}, \{M_{grid}^d(i,j+1)\}_{n-1}, \{M_{grid}^d(i+1,j)\}_{n-1})+1,$$

if $\{M_{grid}^d(i,j)\}_{n-1} = \{M_{grid}^d(i,j)\}_n$, $M_{grind}^d(i,j) = \{M_{grid}^d(i,j)\}_n$, and (pb-1-5) performing region growing in every direction from a seed of the grid map, which has the largest distance in the grid and is expressed by $$(a,b) = \underset{(i,j)}{\operatorname{argmax}}\{M_{grid}^d(i,j)\},$$

to satisfy the relation $M_{grid}^d(i,j)>0$ until the maximum area rectangle is extracted.

Preferably, the image retrieval method further comprises fitting the maximum area rectangle extracted in step (pb-1-5) to the desired size of the texture sample by wrapping. Alternatively, the image retrieval method may further comprise fitting the maximum area rectangle extracted in step (pb-1-5) to the desired size of the texture sample by mirroring.

In the image retrieval method, step (b) may comprise: (b-1) placing the color and texture distances in 2-dimensional vector spaces defined by the respective color and texture distances and their predetermined weighting factors; and (b-2) projecting the result of the projection onto the 2-dimensional vector spaces onto a 1-dimensional distance space based on the human visual perception mechanism.

In the image retrieval method, preferably, the predetermined weighting factor to the color distance is determined based on the distribution of representative colors. More preferably, the predetermined weighting factor to the color distance is determined by:

$$\omega_c = 1 - \sum_{i=1}^{N} p_{qi} \log_{10}\left(\frac{1}{p_{qi}}\right)$$

where $p_{qi}$ is the percentage of the i-th representative color of the query image region.

Preferably, the texture distance is defined by:

$$d'_t(I_q, I_l) = a^{(\frac{A(s)}{A(I_l)} + (count(I_l) - 1))} d_t(I_q, I_l)$$

where $I_q$ denotes the query image or each region of the query image, s denotes the sample region, $A(\cdot)$ denotes the area of the sample region of a desired size, $count(\cdot)$ is the number of wrappings done to obtain the desired size of sample region, and $\alpha$ is a constant.

Preferably, the predetermined weighting factor to the texture distance is determined based on the area of an initial sample region extracted from the query image and the area of a sample region extracted from each data image. More preferably, the predetermined weighting factor to the texture distance is determined by:

$$\omega_t = \frac{1}{a^{\left(\frac{A(s)}{A(I_q)} + (count(I_q) - 1)\right)}}$$

where $I_q$ denotes the query image or each region of the query image, s denotes the sample region, $A(\cdot)$ denotes the area of the sample region of a desired size, $count(\cdot)$ is the number of wrappings done to obtain the desired size of sample region, and $\alpha$ is a constant.

Preferably, the image retrieval method further comprises, before step (b-1), normalizing each of the color and texture distances. In this case, normalizing each of the color and texture distances may be performed using Gaussian normalization. Preferably, normalizing each of the color and texture distances comprises: under the assumption that sequence $v_k$ is a Gaussian sequence, performing normalization within the range of [−1, 1] using $$v_{m,k} = \frac{v_{m,k} - \mu_k}{3\sigma_k}$$

based on the mean value $\mu_k$ and deviation $\sigma_k$ of sequence $v_k$; and mapping the result of the normalization into the range of [0, 1] using $$v'_{m,k} = \frac{v_{m,k} + 1}{2}.$$

Preferably, normalizing each of the color and texture distances comprises normalizing the texture distance by updating the mean value $\mu_t$ and deviation $\sigma_t$ of the texture distances by excluding a largest texture distance until the condition of $$k \times \frac{\mu_c}{\sigma_c} \leq \frac{\mu_t}{\sigma_t},$$

where k is a constant, is satisfied.

In the image retrieval method, step (b-2) may comprise projecting the color and texture distances onto a 1-dimensional distance space using:

$$d(I_q, I_l) =$$
$$W_c d_c(I_q, I_l)\left(1 + \frac{2}{\pi}\tan^{-1}\frac{d'_t(I_q, I_l)}{d_c(I_q, I_l)}\right) + W_t d'_t(I_q, I_l)\left(1 + \frac{2}{\pi}\tan^{-1}\frac{d_c(I_q, I_l)}{d'_t(I_q, I_l)}\right)$$
$$\text{where } W_c = \frac{w_c}{w_c + w_t}, \text{ and } W_t = \frac{w_t}{w_c + w_t}.$$

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
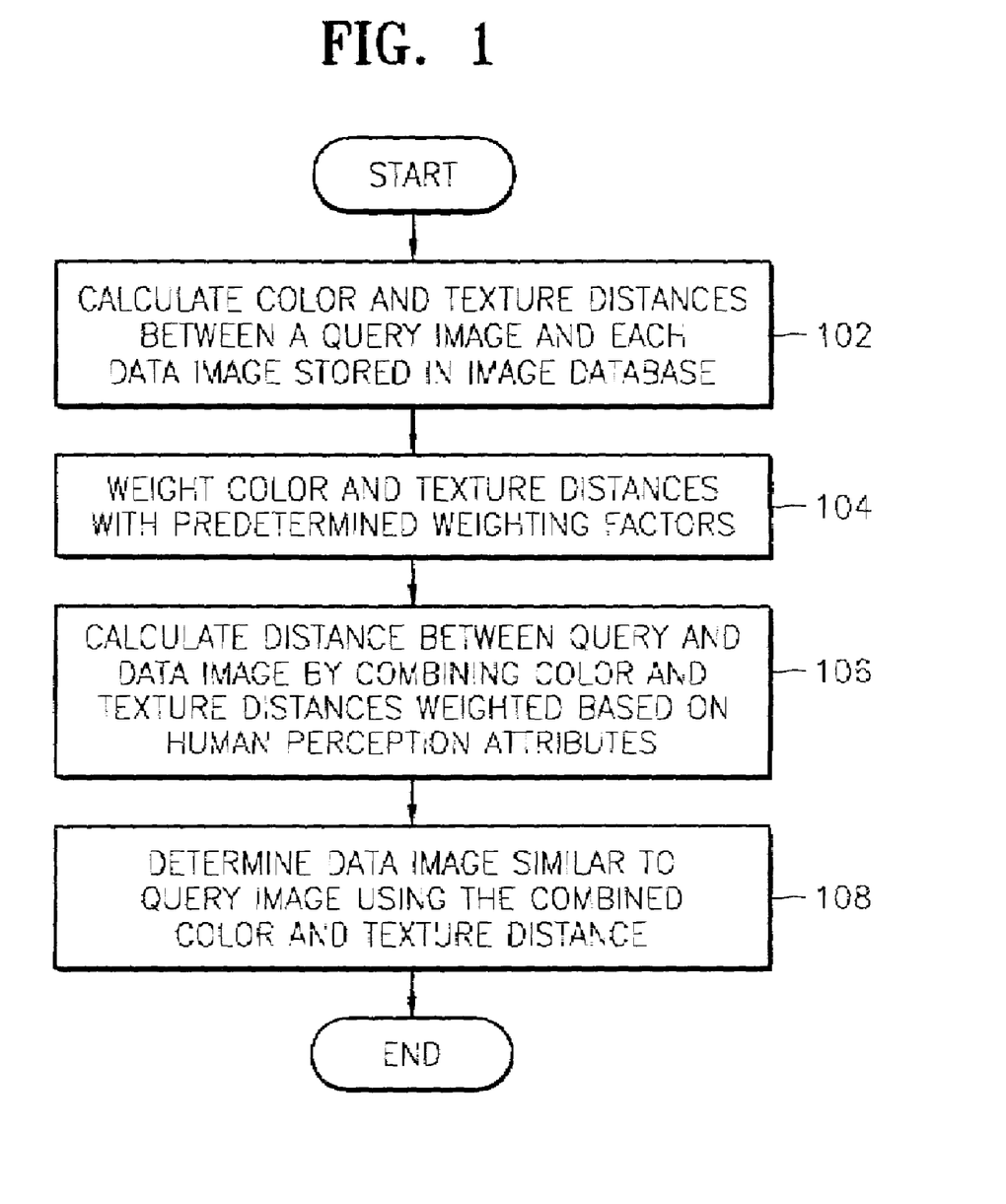
FIG. 1 is a flowchart illustrating the major steps of a preferred embodiment of an image retrieval method according to the present invention.

In an image retrieval method according to the present invention, a data image having similar features as those of a query image is extracted from an image database in which data images are indexed by feature descriptors. FIG. 1 is a flowchart illustrating the major steps of a preferred embodiment of the image retrieval method according to the present invention. Referring to FIG. 1, the image retrieval method according to the present invention involves calculating color and texture distances between a query image and each of the data images stored in the image database (Step 102).

In the present embodiment, it is assumed that each of the data images stored in the image database is segmented into a plurality of regions according to color and/or texture features, and an image region that a user wants to search for in the image database exists in one data image segmented into a plurality of image regions. That image region which is searched for is referred to as a query image region. In the image retrieval method according to the preferred embodiment of the present invention, a data image similar to the query image region is retrieved.

Figure 2:
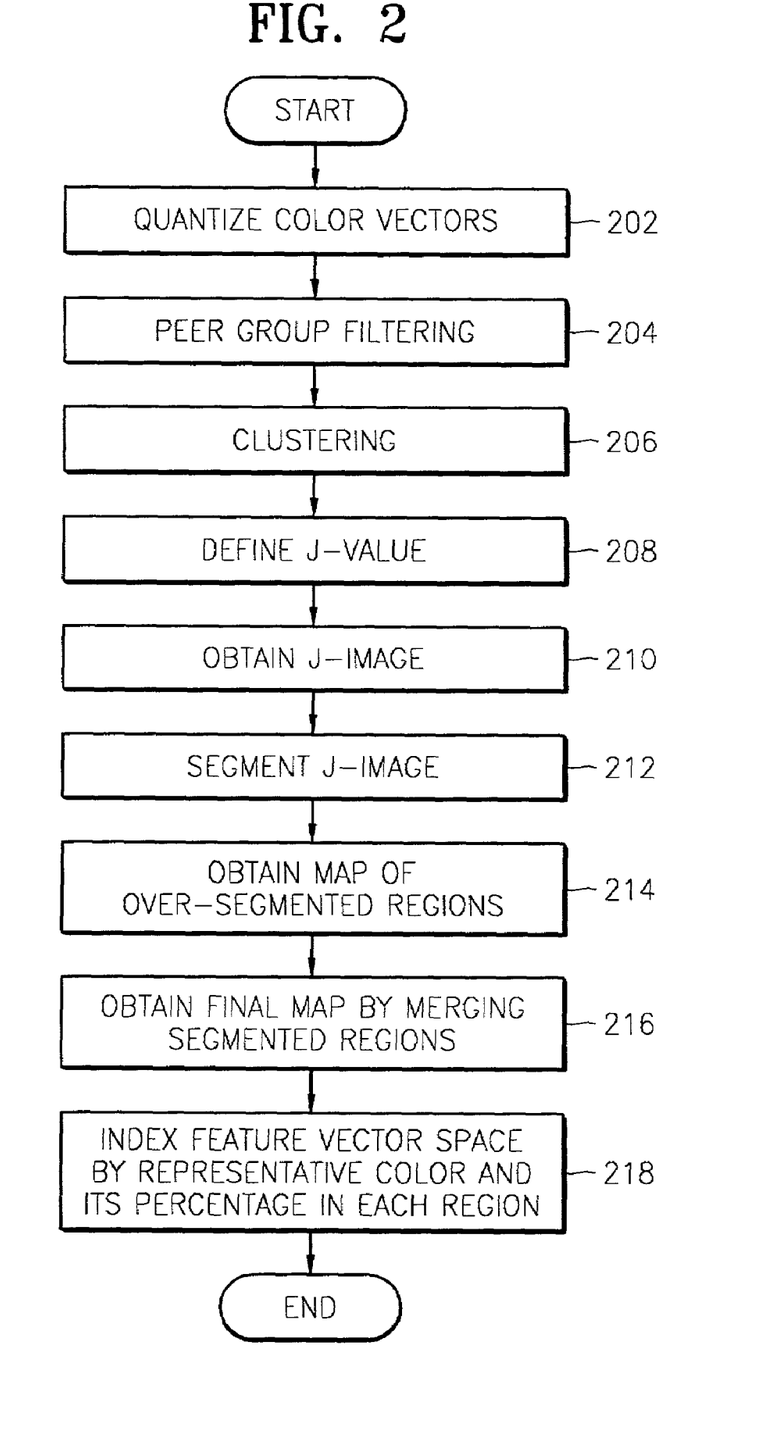
FIG. 2 is a flowchart illustrating an example of indexing data images of an image database by color feature.
Figure 3A:
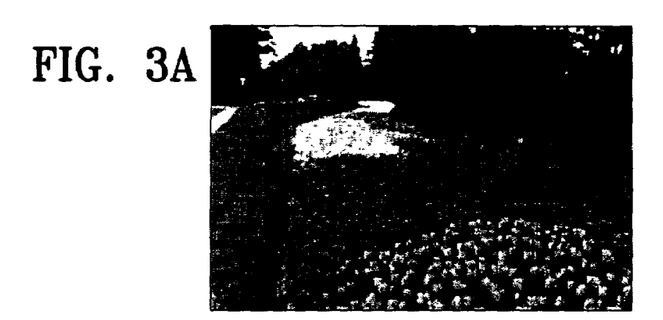
FIG. 3A shows an example of an image segmented according to its color features.
Figure 3B:
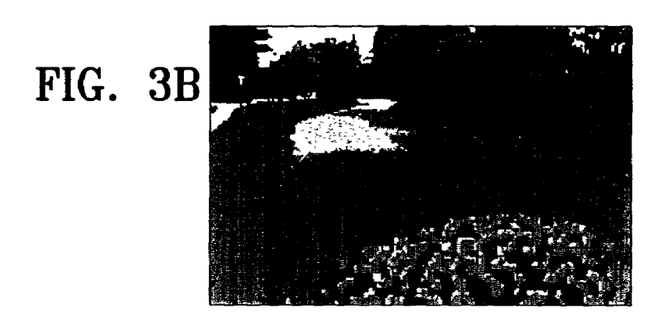
FIG. 3B shows an image expressed with quantized color vectors for the image of FIG. 3A.
Figure 3C:
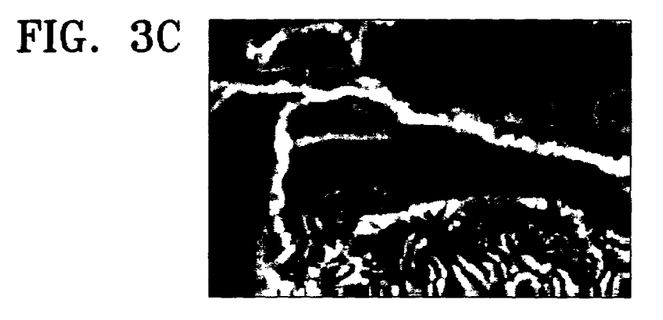
FIG. 3C shows a J-image.
Figure 3D:
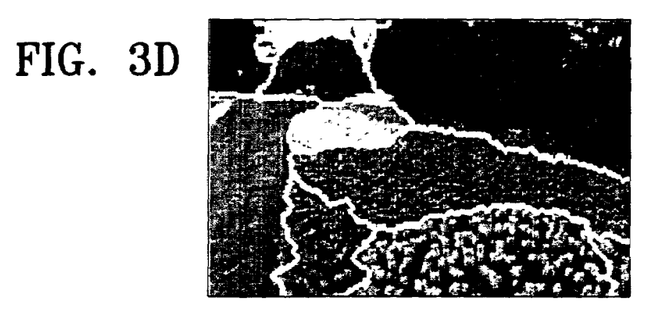
FIG. 3D shows an image after segmentation is completed.

First, a step of extracting color (feature) vectors for the query image and data images and calculating color distances will be described. FIG. 2 shows an example of indexing the image database by color feature. Referring to FIG. 2, color vectors for the query image and data images are quantized (Step 202). FIG. 3A shows an example of an image segmented according to its color features, and FIG. 3B shows an image expressed with the quantized color vectors for the image of FIG. 3A. Next, peer group filtering is performed on the images with the quantized color vectors for noise removal and smoothing effects (Step 204). Peer group filtering is described in a Patent Application PCT/KR00/00090 filed on Feb. 3, 2000 by the present applicant and incorporated by reference herein. Next, filtered pixel values are clustered using the generalized Lloyd algorithm (GLA) (Step 206). Although the number of clusters is fixed for the GLA, a predetermined algorithm can be applied to increase the number of clusters or merge the clusters. Next, a J-value as an index of color uniformity in each pixel after the quantization is defined (Step 208). For the images expressed by the quantized color values, the J-value indicating pixel color uniformity is stored in each of the pixels to obtain a J-image (Step 210). FIG. 3C shows the J-image obtained in Step 210. The J-image is segmented into a plurality of regions by a predetermined method (Step 212). The J-value based image segmentation is disclosed in a Patent Application PCT/KR00/00248 filed on Mar. 22, 2000 by the present applicant and incorporated by reference herein. A map of over-segmented regions is obtained by iterating segmentation (Step 214). Next, a final map is obtained by merging segmented regions based on correlation of color (Step 216), thereby completing the image segmentation. FIG. 3D shows an image after the segmentation is completed.

Next, a feature vector space is indexed by the representative color and its percentage in each segmented region (Step 218). For example, a color feature describer $f_c(I_k)$ of each segmented region is expressed using a representative color vector and the percentage of the representative color vector:

$$f_c(I_k) = \{(\bar{c}_{k1}, p_{k1}), (\bar{c}_{k2}, p_{k2}), \ldots, (\bar{c}_{kN_k}, p_{kN_k})\} \quad (1)$$

where k is a positive integer indicating the serial number of each region, $\bar{c}_{k1}$ is the i-th representative color vector (i=1, 2, ..., N) of the k-th region, $p_{k1}$ is the percentage of the i-th representative color vector, and $N_k$ is the number of the representative color vectors in the k-th region. Then, the representative colors are assigned to grid points in a color space having a grid structure. Next, the indexed results are stored as a table in a database, thereby completing indexing of the feature vector space by the color vectors.

The distance between color vectors of a query image region and a data image region is expressed by:

$$d_c(I_1, I_2) = \sum_{i=1}^{N_1} p_{1i}^2 + \sum_{i=1}^{N_2} p_{2i}^2 - \sum_{i=1}^{N_1}\sum_{j=1}^{N_2} 2a_{1i,2j} p_{1i} p_{2j}. \quad (2)$$

In formula (2), when $T_d$ is the maximum distance by which similarity of two colors is determined, $\alpha$ is a predetermined scaling coefficient, $d_{max} = \alpha T_d$, and $d_{ij}$ is the Euclidean distance $\|c_i - c_j\|$ between two color vectors $c_i$ and $c_j$, $$a_{ij} = 1 - \frac{d_{ij}}{d_{max}}$$

if $d_{ij} \leq T_d$, and $a_{ij} = 0$ if $d_{ij} > T_d$.

Figure 4:
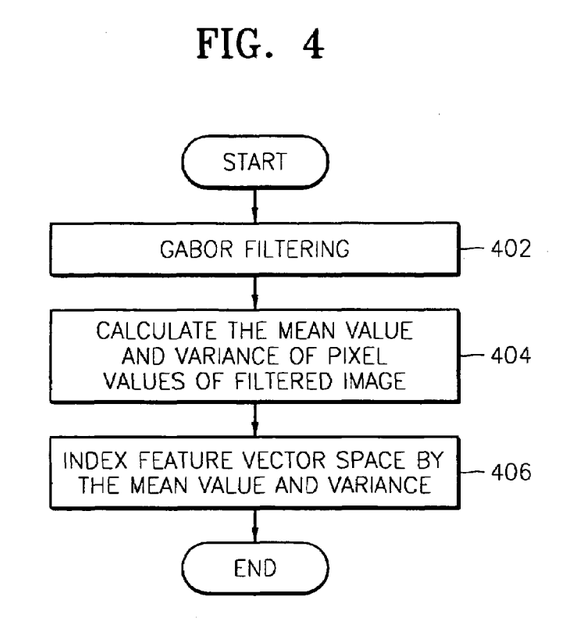
FIG. 4 is a flowchart illustrating indexing data images of an image database by texture feature.

Next, a step of extracting texture (feature) vectors and calculating texture distances will be described. FIG. 4 is a flowchart illustrating indexing an image database by texture feature.

The reason for the wide use of multi-channel filtering in recent years as a texture analysis approach is that the similarity of this multi-channel filtering to human visual perception is evidenced by psychophysical and psychophysiological experiments. The mammalian visual tissue has a perception mechanism for tuning visual signals into narrow band frequencies and orientations. In other words, the visual perception mechanism of humans can be explained with a plurality of channels each having a bandpass filter with particular frequency and orientation angle domains. The important factor in multi-channel filtering texture analysis is to define the functional characteristics of the channels and the number of channels. In addition, the extraction of correct texture features from the image passed through the filters, the relation between each channel, and the appropriate combination of texture features from different channels are also important considerations. The most effective function for modelling texture features is the Gabor function. Referring to FIG. 4, images are filtered by Gabor filtering (Step 402). A 2-dimensional (2-D) Gabor function used for the Gabor filtering of images can be defined as a complex sinusoidal function, which is a modulation of a 2-D Gaussian function the spectrum of which is shifted in the frequency domain. This function is expressed by:

$$h(x, y) = g'(x', y')\exp[2\pi j(U_x + V_y)] \quad (3)$$

$$(x', y') = (x \cos\phi + y \sin\phi + x \sin\phi + y \cos\phi) \quad (4)$$

$$g(x, y) = \frac{1}{2\pi\lambda\delta^2}\exp[-(x^2/\lambda^2 + y^2)/2\delta^2] \quad (5)$$

$$H(\mu, \nu) = \exp\{-2\pi^2\delta^2[(\mu'-U')^2 + (\nu'-V')^2]\} \quad (6)$$

where $\lambda$ is the aspect ratio, and $\delta^2$ is variance.

Figure 5:
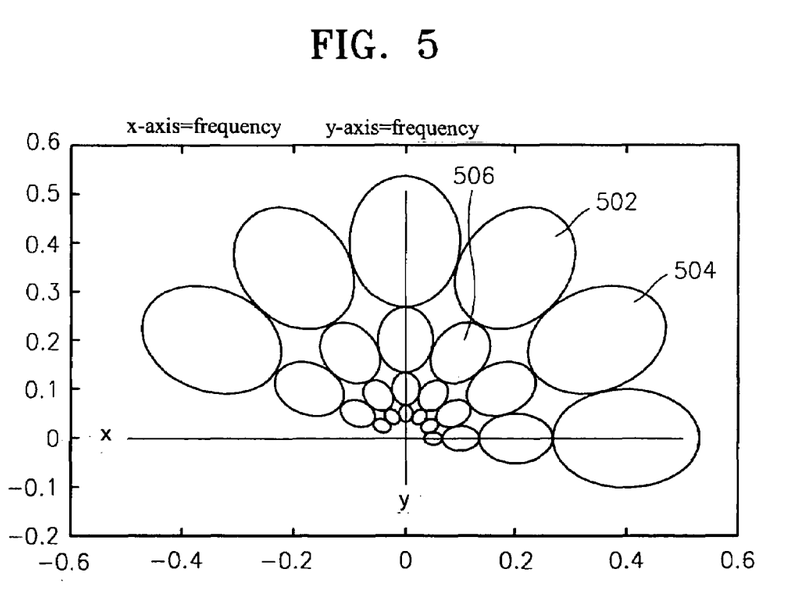
FIG. 5 shows an example of the spatial frequency response equal to half of the 2-D Gabor function.

Supposing that the radial bandwidth is B and the orientation bandwidth is $\Omega$, the radial bandwidth B and the orientation bandwidth $\Omega$ of the Gabor filter are determined such that about half of the spatial-frequency response for each channel filter is the same to reduce redundancy in the Gabor filter. FIG. 5 shows an example of the spatial frequency response equal to half of the 2-D Gabor function. Referring to FIG. 5, a first channel 502 has the same scale as a second channel 504, but different orientation. The first channel 502 has a different scale from a third channel 506, but the same orientation. Gabor filtering for an image is implemented by convolving the image with the Gabor function, thereby outputting different images through filters having different orientations and scales.

The mean value and variance of the pixel values of the filtered image are calculated (Step 404). The mean value and variance of the pixel values obtained by convolution of the image with the Gabor filter represent texture features of the image. Next, the feature vector space is indexed by the mean value and variance of the pixel values (Step 406). The image segmented into a plurality of regions is expressed using the Gabor filter having N frequency channels and M orientation channels:

$$f_t(I_k) = \{(m_{k11}, \sigma_{k11}), (m_{k12}, \sigma_{k12}), \ldots, (m_{k1M}, \sigma_{k1M}),$$
$$(m_{k21}, \sigma_{k21}), \ldots, (m_{kij}, \sigma_{kij}), \ldots, (m_{kNM}, \sigma_{kNM})\} \quad (7)$$

where $m_{kij}$ is the mean value of the pixel values of the i-th frequency channel and j-th orientation channel for image region $I_k$, and $\sigma_{kij}$ is the deviation of the pixel values of the i-th frequency channel and the j-th orientation channel for image region $I_k$.

A distance function for two image regions based on their texture vectors is expressed as:

$$d_t(I_1, I_2) = \sum_{i=1}^{N} \sum_{j=1}^{M} \left| \frac{m_{1ij} - m_{2ij}}{\sigma(m_{ij})} \right| + \sum_{i=1}^{N} \sum_{j=1}^{M} \left| \frac{\sigma_{1ij} - \sigma_{2ij}}{\sigma(\sigma_{ij})} \right|.$$

where $\sigma(m_{ij})$ and $\sigma(\sigma_{ij})$ are the standard deviations for all $m_{ij}$S and $\sigma_{ij}$S, respectively.

According to the present invention, texture features are extracted from an image region having an arbitrary shape. An image region selected by a user has an irregular shape. Color information is irrelevant to the shape of the image region because it is attainable from the number and distribution of color pixels in the image region. Supposing that texture is defined as an irradiance pattern that can be discriminated by its proportion in the spatial frequency domain, the texture feature is affected by pixel patterns and the shape of image regions. It is not easy to apply the Gabor filter that outputs the convolution of an image with the Gabor function to an image having an arbitrary shape. When an image is retrieved through the Gabor filter using texture samples having different sizes, matching efficiency is poor compared with an image retrieval based on the same-sized samples. For this reason, in the present embodiment, there is a need to take rectangular samples from image regions having an arbitrary shape, which are the same in size and represent the texture feature of corresponding regions. In this sampling process, the rectangular samples should be large enough to include the irradiance pattern of the pixels, such that accurate texture information is extracted from the relevant image regions.

Figure 6:
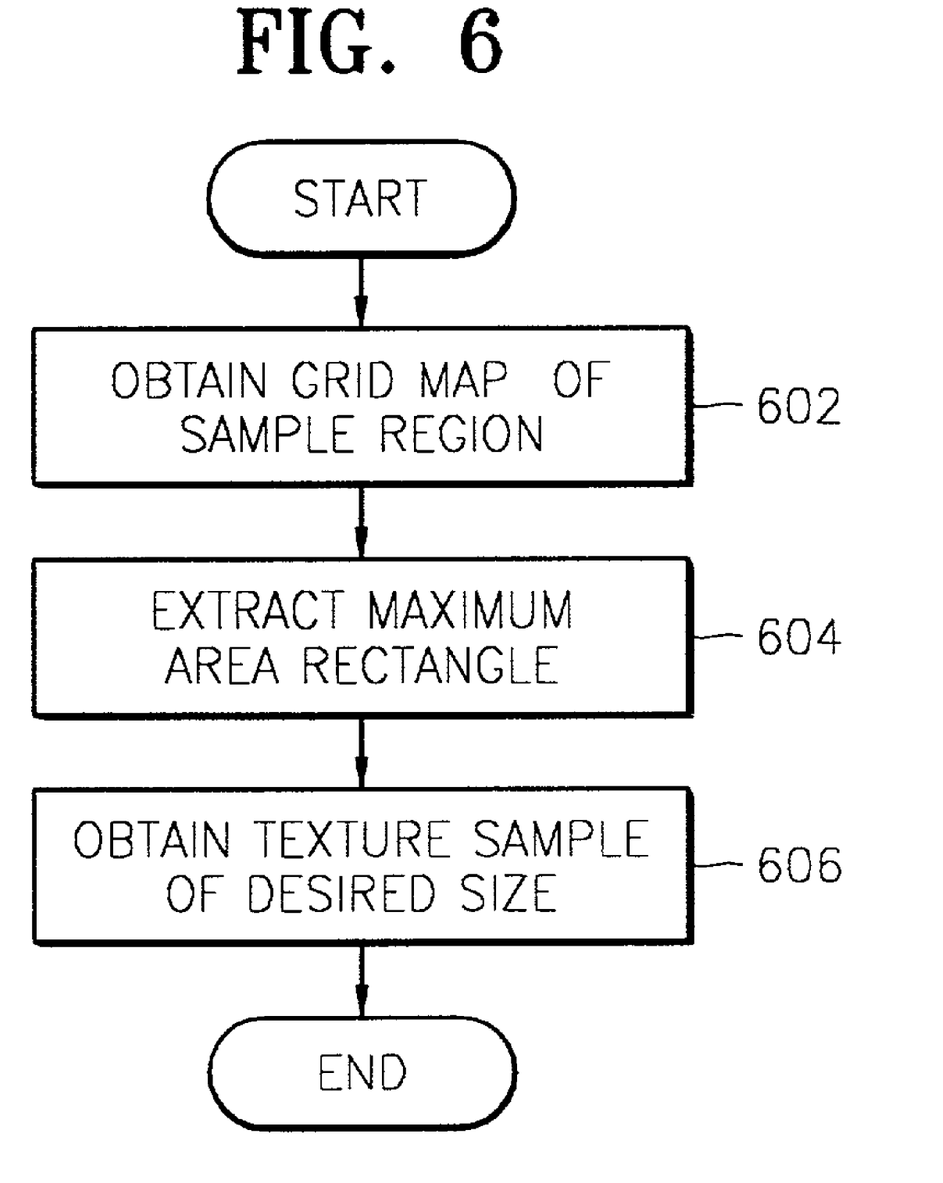
FIG. 6 is a flowchart of an example of taking a texture sample from an image region.

FIG. 6 shows an example of taking a texture sample from an image region. In this step, the texture sample is obtained using the gray image and a map of a sample region. Referring to FIG. 6, a grid map for the sample region is obtained to take a texture sample (Step 602). In particular, a rectangle M(i, j) (where, 0<i<n and 0<j<m), which has largest side lengths, is taken from the sample region. Next, the rectangle M(i, j) is divided into sub-rectangles each having a l×l size. Then, a grid map for the sample region is made with the following predetermined function, which outputs 1 if all the divided grids belong to the sample region, and otherwise outputs 0:

$$M_{grid}(i, j) = \begin{cases} 1 & \text{if } p_{ij}(x, y) \subset I_k \text{ for } \forall (x, y) \\ 0 & \text{otherwise} \end{cases} \quad (9)$$

where $$0 \leq i \leq \left[\frac{n}{l}\right] - 1, \ 0 \leq j \leq \left[\frac{m}{l}\right] - 1,$$

$0 \leq x \leq l-1$, $0 \leq y \leq l-1$, and $p_{ij}(x, y)$ is a point that belongs to rectangle M(il+x, jl+y).

Next, a maximum area rectangle is extracted (Step 604). The grid map obtained in Step 602 is transformed into a grid distance map by repeated computations with:

$$\{M_{grid}^d(i, j)\}_0 = M_{grid}(i, j), \text{ and} \quad (10)$$

$$\{M_{grid}^d(i, j)\}_n = \min(\{M_{grid}^d(i, j-1)\}_{n-1}, \{M_{grid}^d(i-1, j)\}_{n-1}, \{M_{grid}^d(i, j+1)\}_{n-1}, \{M_{grid}^d(i+1, j)\}_{n-1}) + 1,$$
$$\text{if } \{M_{grid}^d(i, j)\}_{n-1} = \{M_{grid}^d(i, j)\}_n, M_{grid}^d(i, j) = \{M_{grid}^d(i, j)\}_n. \quad (11)$$

From a seed of the grid distance map, $$(a, b) = \underset{(i,j)}{\mathrm{argmax}}\{M_{grid}^d(i, j)\},$$

which has the largest distance in the map, region growing is carried out in every direction to satisfy the relation $M_{grid}^d(i, j) > 0$ until the maximum area rectangle is extracted.

Next, a texture sample having a desired size is obtained (Step 606). The maximum area rectangle obtained in Step 604 is fit to the desired size of the texture sample by wrapping. Alternatively, the maximum area rectangle may be fit to the desired size of the texture sample by mirroring. In this case, orientation of the texture should be maintained constant after the mirroring.

Figure 7:
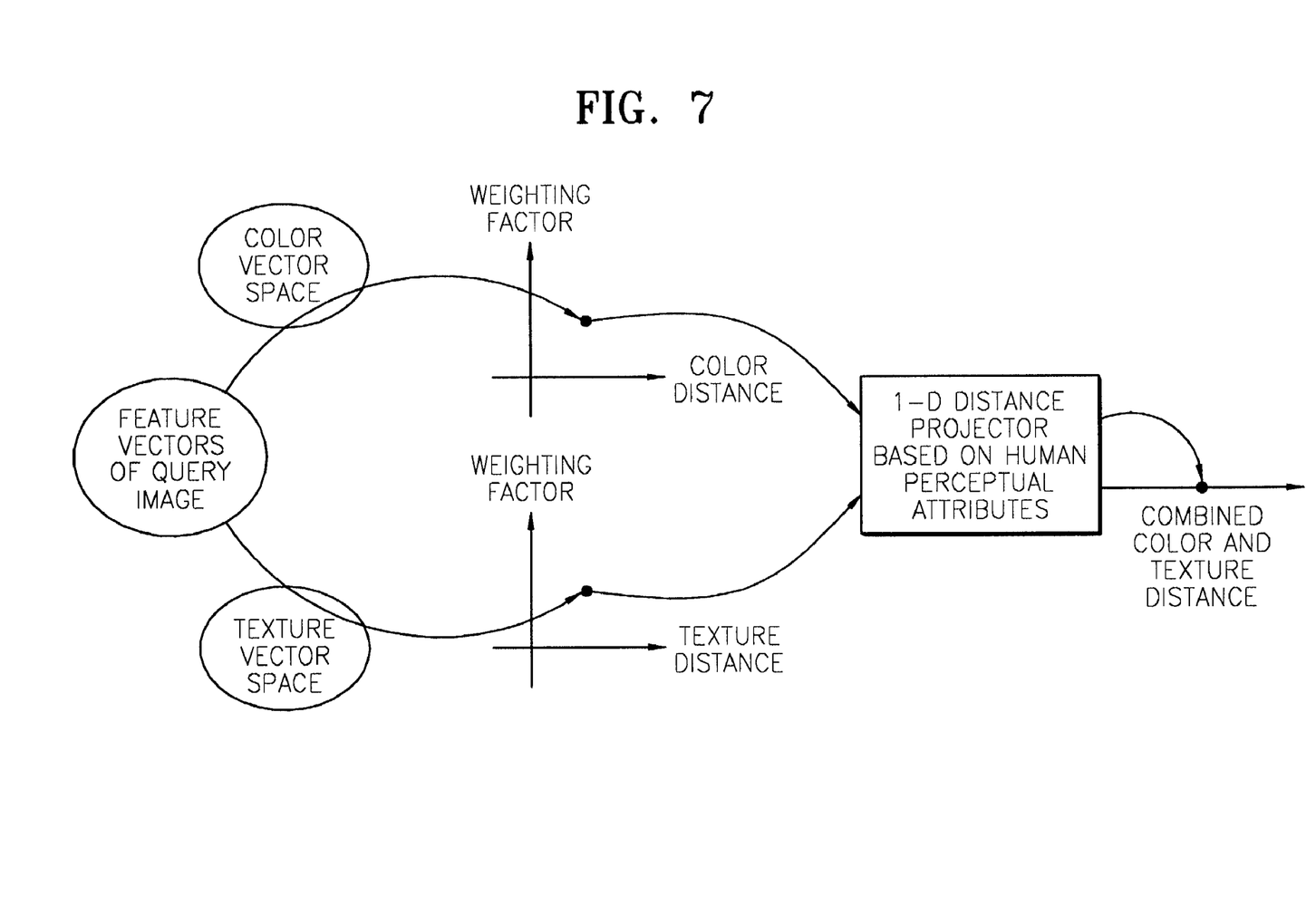
FIG. 7 illustrates a feature of the present invention.

Referring to FIG. 1, after Step 102, color and texture distances are weighted with predetermined weighting factors (Step 104). In the present embodiment of the image retrieval method according to the present invention, color and texture vectors of the data images are compared with those of a query image in the respective vector spaces to separately calculate the color and texture distances. Referring to FIG. 7, the calculated color and texture distances are projected onto 2-D vector spaces with weighting factors. The feature values on the 2-D vector spaces are projected onto a 1-D distance space by considering human perceptual attributes.

In particular, the distance between the color vector of a query image region and the color vector of a data image is defined by the distance function of formula (2) above. A weighting factor applied in this step is determined according to the color distribution. For example, if a dominant color is present, color reliability is great. On the contrary, if a plurality of representative colors are present in similar proportion without a dominant color, color reliability is low. The color distribution is expressed by the entropy function. When the color distribution is uniform over an image region, the entropy function has a larger value. When the color distribution is concentrated on a small portion of the image region, the entropy function has a smaller value. Based on this, a weighting factor to the color feature is defined as:

$$\omega_c = 1 - \sum_{i=1}^{N} p_{qi} \log_{10}\left(\frac{1}{p_{qi}}\right) \quad (12)$$

where $p_{qi}$ is the percentage of the i-th representative color in the query image region. The color-weighting factor $\omega_c$ is set to 0.1 if $\omega_c < 0.1$.

For the texture feature vectors of the query image region and the data image, texture distance is determined using the function having formula (8), in the same manner as for the color distance. When the method described with reference to FIG. 6 is applied to take a texture sample, texture reliability may be low if the texture sample is small. Although the size of the extracted texture sample can be fit to a desired size by wrapping, unsatisfactory texture features may result with increased number of wrappings, due to discontinuity at the wrapping boundaries. Accordingly, in the present embodiment, each initial texture distance $d_t(I_q, I_1)$ is multiplied by a weighting factor.

$$d'_t(I_q, I_l) = a^{\left(\frac{A(s)}{A(I_1)} + (count(I_1) - 1)\right)} d_t(I_q, I_l) \quad (13)$$

where $I_q$ denotes the query image or query image region, s denotes the texture sample of a desired size, $A(\cdot)$ denotes the area of the texture sample of a desired size, $count(\cdot)$ is the number of wrappings done to obtain the desired size of texture sample, and $\alpha$ is a constant.

In a similar way, a weighting factor to the texture feature is defined as:

$$\omega_t = \frac{1}{a^{\left(\frac{A(s)}{A(I_q)} + (count(I_q) - 1)\right)}} \quad (14)$$

where $A(\cdot)$ denotes the area of the texture sample of a desired size.

Next, the distance between the query image region and data image is calculated by the combination of the color and texture distances weighted by considering human perception attributes (Step 106). As shown in FIG. 7, the color and texture distances weighted with the respective weighting factors in Step 104 are projected onto a 1-D distance space through a projector that is based on the human visual perception attributes. To combine the two discrete features, each weighted color and texture distance needs to normalize into similar scales. The normalization is performed using Gaussian normalization in the present embodiment. Under the assumption that sequence $v_k$ is a Gaussian sequence, normalization is performed within the range of [−1, 1] by formula (15) using the mean value $\mu_k$ and deviation $\sigma_k$ of sequence $v_k$ with a 99% confidence factor. Next, the result is normalized within the range [0, 1] by formula (16).

$$v_{m,k} = \frac{v_{m,k} - \mu_k}{3\sigma_k} \quad (15)$$

According to this normalization method using formula (16), values less than 0 or greater than 1 are set to 0 or 1, respectively. This method is effective to prevent the range of the values to be normalized from being narrow due to the presence of extremely large or small values.

For the color distance function, the distance between color vectors is meaningless if a data image has no similar color component to the query image, and a deviation in color distance is small between candidate data images. On the contrary, the distance between texture vectors has a great deviation between candidate data images, and thus the mean value $\mu_t$ and deviation $\sigma_t$ of texture distances is updated by excluding the largest texture distance until the following condition (17) is satisfied, and then the texture distance is normalized using the updated mean value $\mu_t$ and deviation $\sigma_t$:

$$k \times \frac{\mu_c}{\sigma_c} \le \frac{\mu_t}{\sigma_t} \quad (17)$$

where k is a constant.

The normalized color and texture vector distances are combined by the following function (18) by weighting the color and texture vector distances with weighting factors:

$$d(I_q, I_l) = W_c d_c(I_q, I_l)\left(1 + \frac{2}{\pi}\tan^{-1}\frac{d'_t(I_q, I_l)}{d_c(I_q, I_l)}\right) + \quad (18)$$
$$W_t d'_t(I_q, I_l)\left(1 + \frac{2}{\pi}\tan^{-1}\frac{d_c(I_q, I_l)}{d'_t(I_q, I_l)}\right)$$
$$\text{where } W_c = \frac{w_c}{w_c + w_t}, \text{ and } W_t = \frac{w_t}{w_c + w_t}.$$

Next, a data image similar to the query image is determined using the combined color and texture distances (Step 108). As can be inferred from the function (18), when one of the texture and color distances is much smaller than the other, each of the texture and color distances is weighted with different weighting factors, which reflects well the human visual perception mechanism in which similarity is perceived by one influential texture or color feature. In the image retrieval method according to the present invention, each multidimensional feature vector is projected onto respective 2-D vector spaces each having distance and weighting factor as elements, and then onto a 1-D distance space that defines a combined distance of discrete feature vectors. Accordingly, overall computations are relatively simple. In addition, the projector used in the image retrieval method according to the present invention, which uses a small number of weighting factors which adaptively vary depending on, for example, the distribution of feature vectors, enables color and texture vector based image retrieval according to human visual perception.

As described above, according to the present invention, color and texture features extracted from each data image region segmented by color are separately projected as feature vectors onto respective 2-D vector spaces each having elements of weighting factor and corresponding feature vector distance from a query image, and in turn projected onto a 1-D distance space based on human visual perception attributes. Thus, the image retrieval method according to the present invention closely matches the human visual perception mechanism, and overall computations are relatively simple.

To verify performance of the image retrieval method according to the present invention, simulation tests were carried out using 100 image samples (384×256 or 256×384) designed by Corel Corporation. After segmenting the image samples into 2456 image regions in total using a color based segmentation algorithm, color and texture vectors were extracted from each segmented region using color vector and texture vector extraction algorithms. Here, color feature vectors were extracted in the LUV color space, and texture feature vectors were extracted by applying a Gabor filter having 4 frequency channels and 6 orientation channels to texture samples of a 64×64 size. As a result, forty-eight texture vector components were extracted from each region.

Figure 8A:
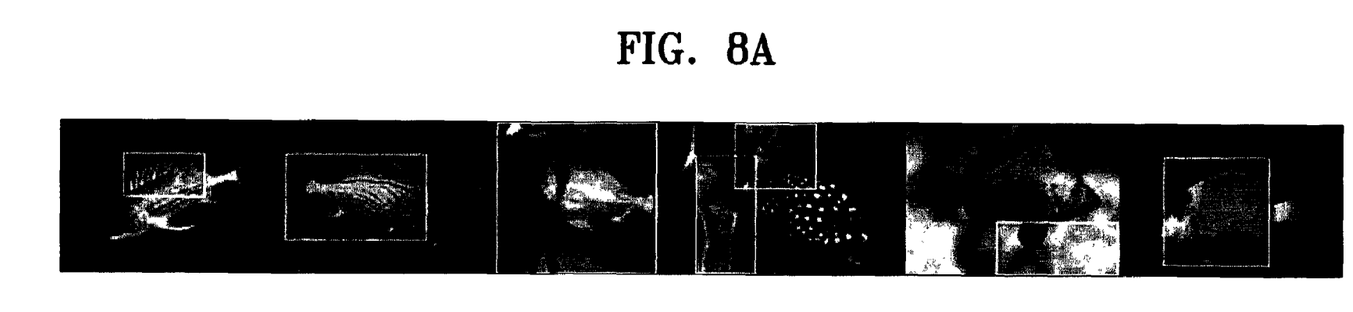
FIG. 8A shows examples of data image regions for a given query image region, which are retrieved by combining color and texture features.
Figure 8B:
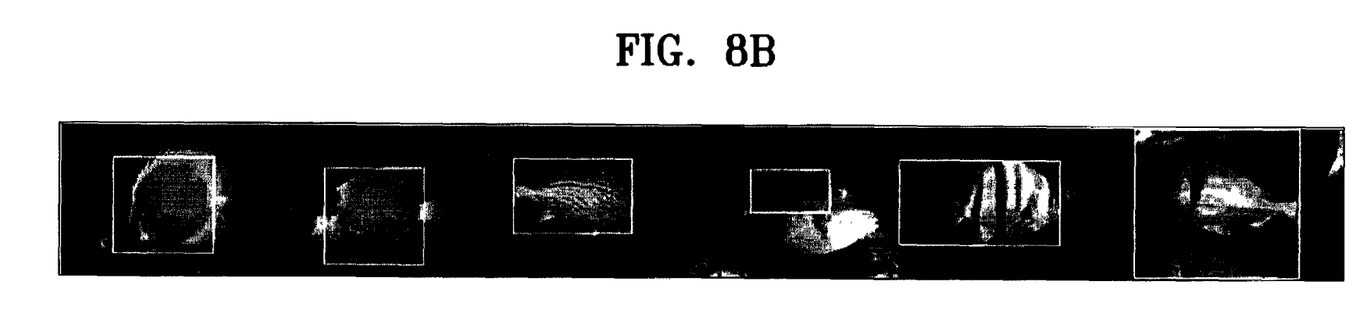
FIG. 8B shows examples of data image regions for a given query image region, which are retrieved based on only color feature.
Figure 8C:
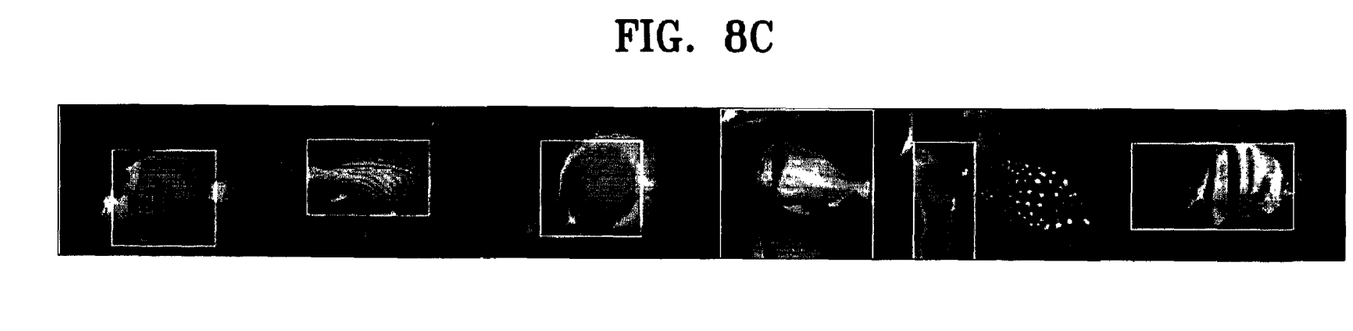
FIG. 8C shows examples of data image regions for a given query image region, which are retrieved by considering texture feature on the candidate data image regions having significant color distances.

FIG. 8A shows examples of data image regions for a given query image region, which are retrieved by combining color and texture features. FIG. 8B shows examples of data image regions for a given query image region, which are retrieved based on only the color feature. FIG. 8C shows examples of data image regions for a given query image region, which are retrieved by considering the texture feature on the candidate data image regions having significant color distances. Referring to FIGS. 8A through 8C, data images similar to the respective query images (here, fish's bodies) are retrieved based on data image regions, i.e., fish's body regions, in which both the color and the texture of the scales are distinct. The resultant data images are satisfactory in view of human perception attributes. Thus, according to the present invention, high-level features of an image can be effectively expressed by the appropriate combination of low-level features, color and texture.

In the image retrieval method according to the present invention described above, data images similar to a query image can be retrieved based on the human visual perception mechanism by combining both color and texture features extracted from image regions. In particular, this image region based retrieval enables accurate retrieval of many objects and many kinds of information from a single image. The distribution of lower-level features, color and texture, in the 2-D vector spaces is projected onto a 1-D distance space, and thus higher-level features can be effectively expressed with a small number of weighting factors and reduced vector computations.

The image retrieval method according to the present invention may be embodied as a program stored on a computer usable medium, including but not limited to storage media such as magnetic storage media, optically readable media, and carrier waves. A functional program, code and code segments, used to implement the present invention can be derived by a skilled computer programmer from the description of the invention contained herein.

What is claimed is:

1. A method for retrieving a data image similar to a query image using a feature distance calculated by combining one or more weighted color distances and one or more weighted texture distances by considering human visual perception attributes,
wherein the one or more weighted color distances and the one or more weighted texture distances are obtained by applying predetermined weighting factor to each texture distance and to each color distance, and
wherein the predetermined weighting factor applied to said each texture distance is determined based on an area of an initial sample region extracted from the iuery image and an area of a sample region extracted from each data image.

2. The method according to claim 1, wherein said combining of the one or more weighted color distances and the one or more weighted texture distances comprises weighing the one or more weighted color distances and the one or more weighted texture distances with differing weighing factors, said variation of the weighting factors reflect the human visual perception attributes.

3. A method for retrieving a data image similar to a query image in an image database containing a plurality of data images, the method comprising:
(a) calculating a plurality of color distances and a plurality of texture distances between a query image and each data image in the image database;
(b) weighting each of the calculated color distances and texture distances with a respective predetermined first weighting factor;
(c) calculating a feature distance between the query image and each data image by combining the weighted color distances and the weighted texture distances by applying a second set of differing weighing factors that reflect human visual perception attributes; and
(d) determining the data image similar to the query image using the feature distances,
wherein the first predetermined weighting factor applied to said each texture distance is determined based on an area of an initial sample region extracted from the query image and an area of a sample region extracted from each data image.

4. The method of claim 3, before step (a), further comprising:
(pa-1) segmenting the query image and each data image into a plurality of first regions using a plurality of color features; and
(pa-2) determining a plurality of sample regions in the query image and each data image for extraction of a plurality of texture features.

5. The method of claim 4, wherein step (a) comprises:
(a1) generating a plurality of color vectors of the first regions using the color features and calculating a plurality of color distances; and
(a2) generating a plurality of texture vectors of the sample regions using the texture features and calculating a plurality of texture distances.

6. The method of claim 5, wherein the color features are expressed by a color feature descriptor $f_c(I_k)$ with a representative color vector and a percentage of the representative color vector for each first region.

7. The method of claim 6, wherein the color feature descriptor $f_c(I_k)$ is expressed by:

$$f_c(I_k) = \{(\bar{c}_{k1}, p_{k1}), (\bar{c}_{k2}, p_{k2}), \ldots, (\bar{c}_{KN_k}, pKN_k)\}$$

wherein k is a positive integer indicating a serial number of each region, $\bar{c}_{ki}$ is an i-th representative color vector of a k-th region i=(1, 2, ..., $N_K$), $P_{ki}$ is a percentage of the ith color representative color vector in the k-th region, and $N_k$ is the number of the representative color vectors in the k-th region.

8. The method of claim 7, wherein the color distance between each color vector of each region of the query image and each color vector of each region of each data image is calculated using:

$$d_c(I_1, I_2) = \sum_{i=1}^{N_1} p_{1i}^2 + \sum_{i=1}^{N_2} p_{2i}^2 - \sum_{i=1}^{N_1}\sum_{j=1}^{N_2} 2a_{1i,2j} p_{1i} p_{2j}$$

wherein when $T_d$ is a maximum distance by which a similarity of two colors is determined, $\alpha$ is a predetermined scaling coefficient, $d_{max} = \alpha \, \alpha \, T_d$, and $d_{ij}$ is the Euclidean distance $\|c_i - c_j\|$ between two color vectors $c_i$, and $c_j$, such that $$a_{ij} = 1 - \frac{d_{ij}}{d_{max}}$$

if $d_{ij} \leq T_d$,
and $\alpha_{ij}=0$ if $d_{ij}>T_d$.

9. The method of claim 5, wherein step (a2) uses a Gabor function.

10. The method of claim 9, wherein, in step (a2), the texture vectors of the plurality of sample regions are generated using the Gabor function having N frequency channels and M orientation channels, where N and M are both predetermined positive integers.

11. The method of claim 10, wherein the texture features are expressed by a texture feature descriptor $f_t(I_k)$:

$$f_t(I_k)=\{(m_{k11}, \sigma_{k11}), (m_{k12}, \sigma_{k12}), \ldots, (m_{k1M}, \sigma_{k1M}), (m_{k21}, \sigma_{k21}), \ldots, (m_{kij}, \sigma_{kij}), \ldots, (m_{kNM}, \sigma_{kNM})\}$$

wherein $m_{kij}$ is a mean value of a plurality of pixel values of the i-th frequency channel and the j-th wherein $m_{kiJ}$ is a mean value of a plurality of pixel values of the i-th frequency channel and the j-th orientation channel for a sample region $I_k$, and $\sigma_{kij}$ is a deviation of the pixel values of the i-th frequency channel and the j-th orientation channel for the sample region $I_k$.

12. The method of claim 11, wherein, in step (a2), the texture distance between each color vector of each region of the query image and each color vector of each sample region of each data image is calculated using:

$$d_t(I_1, I_2) = \sum_{i=1}^{N} \sum_{j=1}^{M} \left| \frac{m_{1ij} - m_{2ij}}{\sigma(m_{ij})} \right| + \sum_{i=1}^{N} \sum_{j=1}^{M} \left| \frac{\sigma_{1ij} - \sigma_{2ij}}{\sigma(\sigma_{ij})} \right|$$

where $\sigma(m_{ij})$ and $\sigma(\sigma_{ij})$ are the standard deviations for all $m_{ij}$ and $\sigma_{ij}$, respectively.

13. The method of claim 4, wherein step (pa-1) comprises quantizing a plurality of color vectors of the query image and each data image.

14. The method of claim 13, wherein quantizing the color vectors comprises:
(pa-1-1) performing a peer group filtering on the query image and each data image for noise removal and smoothing effects; and
(pa-1-2) clustering a plurality of filtered pixel values of the query image and each data image using a generalized Lloyd algorithm.

15. The method of claim 14, wherein step (pa-1-2) comprises applying a predetermined algorithm to increase the number of resulting clusters or to merge the resulting clusters.

16. The method of claim 13, further comprising:
defining a J-value indicating a color uniformity in each pixel of a plurality of pixels of the query image and each data image, which have undergone quantization;
storing the J-value in each pixel of the query image and each data image to obtain a plurality of J-images;
segmenting each J-image into a plurality of second regions by a predetermined segmentation method;
repeating the segmentation of each J-image to obtain a map of one or more over-segmented regions for each J-image; and
obtaining a final map for each J-image by merging the over-segmented regions based on a correlation of color.

17. The method of claim 16, further comprising indexing a feature vector space by a representative color and a percentage of the representative color in each second region.

18. The method of claim 17, wherein indexing the feature vector space comprises:
assigning a plurality of representative colors to a plurality of grid points in a color space having a grid structure; and
storing the result of the assignment as a table in a database.

19. The method of claim 4, wherein step (pa-2) comprises:
(pb-1-) obtaining a grid map of the query image and each data image; and
(pb-2-) obtaining a texture sample of a desired size for each sample region based on the grid map.

20. The method of claim 19, wherein step (pb-1) comprises:
(pb-1-1) taking a rectangle M(i, j) having largest side lengths for a sample region,
wherein $0 \leq i \leq n$ and $0 \leq j \leq m$;
(pb-1-2) dividing the rectangle M(i, j) into a plurality of sub-rectangles each having a l×l size; and
(pb-1-3) obtaining a grid map for the sample region using a predetermined function which outputs 1 if all the divided grids belong to the sample region, and otherwise, outputs 0, the predetermined function expressed by:

$$M_{grid}(i, j) = \begin{cases} 1 & \text{if } p_{ij}(x, y) \in I_k \text{ for } \forall (x, y) \\ 0 & \text{otherwise} \end{cases}$$

wherein $$0 \leq i \leq \left[\frac{n}{l}\right] - 1,$$

being a result of applying the floor function, $$0 \leq j \leq \left[\frac{m}{l}\right] - 1$$

where [m/l] is a result of applying the ceiling function, $0 \leq x \leq l-1$, $0 \leq y \leq l-1$, and $p_{ij}(x, y)$ is a point that belongs to rectangle M(il+x, jl+y).

21. The method of claim 20, after step (pb-1-3), further comprising:
(ph-1-4) transforming the grid map obtained in step (pb-1-3) to a grid distance map by repeating computations with:

$\{M_{grid}^d(i, j)\}_0 = M_{grid}(i, j)$, and $\{M_{grid}^d(i, j)\}_n = \min(\{M_{grid}^d(i, j-1)\}_{n-1}, \{M_{grid}^d(i-1, j)\}_{n-1}, \{M_{grid}^d(i, j+1)\}_{n-1}, \{M_{grid}^d(i+1, j)\}_{n-1}) + 1$, if $\{M_{grid}^d(i, j)\}_{n-1} = \{M_{grid}^d(i, j)\}_n$, $M_{grind}^d(i, j) = \{M_{grid}^d(i, j)\}_n$, and (pb-1-5) performing region growing in every direction from a seed of the grid map, which has the largest distance in the grid and is expressed by $$(a, b) = \underset{(i,j)}{\mathrm{argmax}}\{M_{grid}^d(i, j)\},$$

to satisfy the relation $M_{grid}^d(i, j) < 0$ until a maximum area rectangle is extracted.

22. The method of claim 21, further comprising fitting the maximum area rectangle extracted in step (pb-1-5) to the desired size of the texture sample by wrapping.

23. The method of claim 21, further comprising fitting the maximum area rectangle extracted in step (pb-1-5) to the desired size of the texture sample by mirroring.

24. The method of claim 4, wherein step (b) comprises:
 (b-1) placing each of the color distances and the texture distances in a 2-dimensional vector space, each vector space defined by the respective distances and associated predetermined weighting factors; and
 (b-2) projecting the result of the placement onto the 2-dimensional vector spaces onto a 1-dimensional distance space based on the human visual perception mechanism.

25. The method of claim 24, wherein the predetermined weighting factor to the color distance is determined by:

$$\omega_c = 1 - \sum_{i=1}^{N} p_{qi} \log_{10}\left(\frac{1}{p_{qi}}\right)$$

wherein $p_{qi}$ is a percentage of an i-th representative color of one of the first regions of the query image.

26. The method of claim 24, wherein each texture distance is defined by:

$$d_t'(I_q, I_l) = a^{\left(\frac{A(s)}{A(I_l)} + (count(I_l)-1)\right)} d_t(I_q, I_l)$$

wherein $I_q$ denotes the query image or each first region of the query image, s denotes a sample region of a desired size, $A(\cdot)$ denotes the area of the sample region of the desired size, $count(\cdot)$ is the number of wrappings done to obtain the sample region of the desired size, and $\alpha$ is a constant, and where $d_t(I_q, I_l)$ is a distance function for two images based on their texture vectors.

27. The method of claim 24, wherein the predetermined weighting factor applied to each texture distance is determined based on an area of an initial sample region extracted from the query image and the area of a sample region extracted from each data image.

28. The method of claim 27, wherein the predetermined weighting factor applied to each texture distance is determined by:

$$\omega_t = \frac{1}{a^{\left(\frac{A(s)}{A(I_q)} + (count(I_q)-1)\right)}}$$

wherein $I_q$ denotes the query image or each first region of the query image, s denotes a sample region of a desired size, $A(\cdot)$ denotes the area of the sample region of the desired size, $count(\cdot)$ is the number of wrappings done to obtain the sample region of the desired size, and $\alpha$ is a constant.

29. The method of claim 24, before step (b-2), further comprising normalizing each of the color distances and the texture distances.

30. The method of claim 29, wherein normalizing each of the color distances and the texture distances is performed using a Gaussian normalization.

31. The method of claim 30, wherein normalizing each of the color distances and the texture distances comprises:
 wherein $V_k$ is a Gaussian sequence, performing a normalization within a range of $[-1, 1]$ using $$v_{m,k} = \frac{v_{m,k} - \mu_k}{3\sigma_k}$$

based on a mean value $\mu_k$ and a deviation $\sigma_k$ of the sequence $V_k$; and
 mapping the result of the normalization into a range of $[0, 1]$ using $$v_{m,k}' = \frac{v_{m,k} + 1}{2}.$$

32. The method of claim 31, wherein normalizing each of the color distances and the texture distances comprises normalizing the texture distances by updating the mean value $\mu_t$, and the deviation $\sigma_t$ of the texture distances by excluding a largest texture distance until the condition of $$k \times \frac{\mu_c}{\sigma_c} \leq \frac{\mu_t}{\sigma_t},$$

wherein k is a constant, is satisfied.

33. The method of claim 24, wherein step (b-2) comprises projecting the color distances and the texture distances onto a 1-dimensional distance space using:

$$d(I_q, I_l) = W_c d_c(I_q, I_l)\left(1 + \frac{2}{\pi}\tan^{-1}\frac{d_t'(I_q, I_l)}{d_c(I_q, I_l)}\right) +$$
$$W_t d_t'(I_q, I_l)\left(1 + \frac{2}{\pi}\tan^{-1}\frac{d_c(I_q, I_l)}{d_t'(I_q, I_l)}\right) \text{ wherein } W_c =$$
$$\frac{\omega_c}{\omega_c + \omega_t} \text{ and } W_t = \frac{\omega_t}{\omega_c + \omega_t}.$$

wherein $\omega_c$ and $\omega_t$ are weighing factors of the color distances and texture distances respectively, where $d_c(I_q, I_l)$ and where $d_t'(I_q, I_l)$ represent normalized distance functions for two image regions based on their color and texture vectors, respectively.

34. The method of claim 3, wherein the predetermined weighting factor to the color distance is determined based on a distribution of representative colors.

* * * * *